United States Patent

Kohara et al.

Patent Number: 5,276,098
Date of Patent: Jan. 4, 1994

[54] THERMOPLASTIC SATURATED NORBORNENE GROUP POLYMER COMPOSITION

[75] Inventors: Teiji Kohara, Kawasaki; Tadao Natsuume, Yokosuka, both of Japan

[73] Assignee: Nippon Zeon Co., Ltd., Tokyo, Japan

[21] Appl. No.: 830,081

[22] Filed: Feb. 3, 1992

[30] Foreign Application Priority Data

Feb. 4, 1991 [JP] Japan ................................ 3-035659
Dec. 20, 1991 [JP] Japan ................................ 3-355986

[51] Int. Cl.$^5$ .......................................... C08L 71/02
[52] U.S. Cl. .................................. 525/185; 525/186; 525/187; 525/333.3; 525/384; 526/282
[58] Field of Search ............ 525/185, 186, 187, 333.3, 525/384; 526/282

[56] References Cited

U.S. PATENT DOCUMENTS 5,063,096 11/1991 Kohara et al. ........................ 428/64

Primary Examiner—Patrick J. Ryan
Assistant Examiner—Elizabeth Evans
Attorney, Agent, or Firm—Armstrong, Westerman, Hattori, McLeland & Naughton

[57] ABSTRACT

A composition including a thermoplastic saturated norbornene group polymer and a partially etherified product of a polyhydric alcohol having at least 3 hydroxyl groups incorporated thereinto. The composition exhibits excellent adhesion to the recording film of an optical disk and adhesion to a hard coating film or a protective film formed by coating an acrylic ultraviolet curing coating material or like films without deteriorating the excellent heat resistance and transparency inherent to thermoplastic saturated norbornene group polymers. An optical disk substrate formed of this composition and an optical disk including the optical disk substrate and an information recording film and/or a light reflecting film and a protective film laminated thereon are also disclaimed.

9 Claims, No Drawings

THERMOPLASTIC SATURATED NORBORNENE GROUP POLYMER COMPOSITION

BACKGROUND OF THE INVENTION

The present invention relates to a resin material useful as an optical material for optical disk substrates and the like. In more particular, the invention relates to a composition based on a thermoplastic saturated polymer formed mainly of a norborne group monomer (said polymer being hereinafter referred to as norbornene group polymer) which is excellent in adhesion to the information recording film (hereinafter simply referred to as recording film) of optical disks, and adhesion to a hard coating film or a protective film comprising a coating film of an acrylic ultraviolet curing coating material or such (these films being hereinafter simply referred to as protective film).

RELATED ART

Thermoplastic saturated norbornene group polymers are a known resin material having excellent characteristics as an optical material for optical disk substrates and the like (Japanese Patent Application Kokai (Laid-open) Nos. 60-26024, 60-168708, 61-115912, 61-120816, 63-218727, 63-317520, 1-132628, 1-168724, 1-168725, 1-172422, 3-14882, 3-122137, and other literature).

Optical parts formed of thermoplastic saturated norbornene group polymers are excellent in transparency, heat resistance, low moisture absorption, low birefringence, etc. Further, thermoplastic saturated norbornene group polymers show excellent processability including high flowability and good mold release. However, when a recording film is formed on an optical disk substrate formed of a thermoplastic saturated norbornene group polymer of the prior art and then an acrylic ultraviolet curing coating material is coated thereon to form a protective film, the adhesion of the protective film (i.e., coating film) to the thermoplastic saturated norbornene group polymer surface is not sufficiently good.

It has been proposed to increase the processability into optical disk substrates and the adhesion of recording film thereto in high temperature and high humidity atmospheres by incorporating a partially esterified product of polyhydric alcohols into thermoplastic saturated norbornene group polymers (Japanese Patent Application Kokai (Laid-open) No. 63-275654). However, the fatty acid esters of glycerol or pentaerythritol exemplified in said patent application present several difficulties. They have insufficient compatibility with thermoplastic saturated norbornene group polymers, hence are liable to bleed out and greatly lower the glass transition temperature. They must be added in large amounts to improve the adhesion to the recording film. Moreover, they were found to be ineffective in improving the adhesion to the acrylc ultraviolet curing protective coating film.

On the other hand, it has been proposed, in molding optical disk substrates and lenses by using polycarbonate as the synthetic resin raw material, to improve the mold release in molding by incorporation of an alkyl eter of glycerol (Japanese Patent Application Kokai (Laid-open) No. 1-315460). This method, however, does not intend to improve adhesion to protective film or such.

SUMMARY OF THE INVENTION

The object of the present invention is to provide a resin composition based on a thermoplastic saturated norbornene group polymer which is excellent in adhesion to the recording film of optical disks and adhesion to a hard coating film or a protective film formed by coating an acrylic ultraviolet curing coating material or like films, without deteriorating excellent heat resistance and transparency inherent to thermoplastic saturated norbornene group polymers.

The present inventors have made extensive study to overcome the problems of the prior art techniques mentioned above. As the result it has been found that by incorporation of a partially etherified product of polyhydric alcohols into thermoplastic saturated norbornene group polymers, as compared with incorporation of fatty acid esters of polyhydric alcohols, such as the fatty acid esters of glycerol or pentaerythritol, of the prior art, excellent compatibility results, hence bleeding is suppressed, the lowering of the glass transition temperature is small, adhesion to the recording film is greatly improved by incorporation of a small amount, and further adhesion to the protective film formed by coating an acrylic ultraviolet curing coating material is also improved, without deteriorating the processability of the resulting composition. The present invention has been accomplished on the basis of above finding.

DETAILED DESCRIPTION OF THE INVENTION

Thus, according to the present invention, there is provided a thermoplastic saturated norbornene group polymer composition comprising a thermoplastic saturated norbornene group polymer and a partially etherified product of a polyhydric alcohol having 3 or more hydroxyl groups incorporated thereinto.

Further, according to the present invention, there are provided an optical disk substrate using said composition and an optical disk using said optical disk substrate.

The present invention will be described in detail below.

THERMOPLASTIC SATURATED NORBORNENE GROUP POLYMER

The base polymers used in the present invention are thermoplastic saturated norbornene group polymers publicly known, for example, from the patent applications cited above. The thermoplastic saturated norbornene group polymers include (a) hydrogenation products of ring-opening polymers (including copolymers) of norbornene group monomers and (b) copolymers of norbornene group monomers with olefinic monomers such as ethylene and/or α-olefins. They have substantially no unsaturated bond.

Norbornene group monomers may be those publicly known from the patent applications cited above and Japanese Patent Application Kokai (Laid-open) Nos. 2-227424 and 2-276842. As specific examples, mention may be made of norbornene, methanooctahydronaphthalene, dimethanooctahydronaphthalene, dimethanododecahydroanthracene, trimethanododecahydroanthracene, and the substituted derivatives thereof; dicyclopentadiene, 2,3-dihydrodicyclopentadiene, methanooctahydrobenzoindene, dimethanooctahydrobenzoindene, methanodecahydrobenzoindene, dimethanodecahydrobenzoindene, methanooctahydrofluorene, dimethanooctahydrofluorene, and the substituted derivatives thereof. The substituents in said substituted derivatives may be either a hydrocarbon group or a polar group so long as they are known to the art; they include, for example, an alkyl group, alkylidene group, aryl group, cyano group, halogen atom, alkoxycarbonyl group and pyridyl group. The norbornene group monomers may be used each alone or in a combination of two or more thereof.

To obtain a glass transition temperature of the hydrogenation product of the ring-opening polymer of norbornene group monomers of 100° C. or more, it is preferable to use, among the above-mentioned monomers, those of 4 rings or 5 rings, or to use a monomer of 2 or 3 rings in combination with the above-mentioned monomers used as the main component. It is also possible to use, as a copolymerizing component, other cycloolefins, such as cyclopropene, cyclobutene, cyclopentene, cycloheptene, cyclooctene, 5,6-dihydrodicyclopentadiene and the like, usually in the range of 30% by weight or less.

The ring-opening polymer of a norbornene group monomer may be obtained by known methods of ring-opening polymerization, for example, by using a catalyst system comprising a transition metal compound such as titanium tetrachloride, an organometallic compound such as organoaluminum compound, and a tertiary amine and adding the titanium component and the monomer in succession. It is needless to say that polymers prepared with other catalyst systems may also be used. Though the ring-opening polymerization can be conducted without using a solvent, it is usually performed in an inert organic solvent, for example, aromatic hydrocarbons such as benzene, toluene, xylene and the like, aliphatic hydrocarbons such as hexane, heptane and the like and alicyclic hydrocarbons such as cyclohexane and the like. The polymerization temperature and polymerization pressure are usually selected from the ranges of $-20°$ C. to 100° C. and 0 to 50 kg/cm$^2$, respectively.

The hydrogenation product of the ring-opening polymer of norbornene group monomers may be prepared by using known hydrogenation catalysts used in the hydrogenation of olefinic compounds, for example, a Wilkinson complex, cobalt acetate/triethylaluminum, nickel acetylacetate/triisobutylaluminum, palladium-carbon, ruthenium-carbon, nickel-diatomaceous earth, and the like. The hydrogenation is generally conducted under a hydrogen pressure of 1–200 atm. at 0°–250° C. and, depending on the kinds of catalyst used, either in a homogeneous system or in a heterogeneous system. The hydrogenation rate is desirably 90% or more, preferably 95% or more, more preferably 99% or more, in view of resistance to thermal deterioration and resistance to photo-degradation.

Copolymers of norbornene group monomers with ethylene and/or o-olefins also may be obtained by known methods of copolymerization.

As examples of olefinic monomers used in the present invention, mention may be made of ethylene and $\alpha$-olefins such as propylene, 1-butene, 1-pentene, 1hexene, 1-octene, 1-decene, 3-methyl-1-butene, 3-methyl-1-pentene, 4-methyl-1-pentene, vinylcyclohexane, 4vinylcyclohexene and the like. These olefinic monomers may be used each alone or in a combination of two or more thereof.

It is also allowable to copolymerize additional other monomer components such as cycloolefins, diolefins and the like during the preparation step of the copolymer within limits not deleterious to the object of the present invention. When the resultant copolymer is a saturated polymer it can be used as it is, whereas when it has an unsaturated bond it is preferably hydrogenized.

The molecular weight of these thermoplastic saturated norbornene group polymers is in the range of generally 0.3–3.0 dl/g, preferably 0.4–1.0 dl/g, as expressed in terms of intrinsic viscosity determined in decalin or chlorobenzene at 80° C. as a measure for judging molecular weights.

PARTIALLY ETHERIFIED PRODUCT OF POLYHYDRIC ALCOHOL

The polyhydric alcohol in the partially etherified product of a polyhydric alcohol used in the present invention has at least three hydroxyl groups, preferably 3–8 hydroxyl groups.

As specific examples of the polyhydric alcohol having 3 or more hydroxyl groups, mention may be made of glycerol, trimethylolpropane, pentaerythritol, diglycerol, triglycerol, dipentaerythritol, 1,6,7-trihydroxy-2,2-di(hydroxymethyl)-4-oxoheptane, sorbitol, 2-methyl-1,6,7-trihydroxy-2-hydroxymethyl-4-oxoheptane, 1,5,6-trihydroxy-3-oxohexane, and the like.

In the present invention are used partially etherified products obtained by the etherification of a part of the alcoholic hydroxyl groups of the polyhydric alcohols mentioned above. In order to suppress the development of bleeding in moldings prepared from the composition of the present invention, the partially etherified product has a molecular weight of generally 200–800, preferably 250–650, and has at least one, preferably 2–16, more preferably 2–10, free, i.e. unetherified, alcoholic hydroxyl groups in one molecule, 10–50%, more preferably 12–35%, of the alcoholic hydroxyl groups of polyhydric alcohols have been being etherified. The substituents used for the etherification are not particularly limited, but are generally those of 4–100 carbon atoms, those of 4–30 carbon atoms being preferred and those of 8–22 carbon atoms being particularly preferred. Preferred examples thereof include straight or branched alkyl or alkylene groups of 4–30 carbon atoms, and aryl or arylene groups of 6–30 carbon atoms. When the number of carbon atoms is too small, the partially etherified products tend to vaporize and the resultant moldings are liable to develop bleeding. When the number of carbon atoms is too large the partially etherified products are poor in compatibility with thermoplastic saturated norbornene group polymers.

The etherification may also be performed by using condensation products of phenols with aldehydes and/or ketones, the hydrogenation products of said condensation products, condensation products obtained by the Friedel-Crafts reaction of phenols with unsaturated hydrocarbons such as diolefins and the like, the hydrogenation products of said condensation products, and the mixtures of two or more thereof. In these products mentioned above, novolak-type condensation product ( residues of generally 13–100 carbon atoms, preferably 13–75 carbon atoms, more preferably 13–30 carbon atoms, or the hydrogenation products thereof are used as the substituent in the etherification. Particularly preferred among them are those having a degree of condensation of 4 or less. When the degree of condensation is too large the compatibility becomes poor. A preferable degree of condensation is 1.5–4.0 in terms of the average number of molecules in the condensation product. The molecular weight of the etherified product in this case is generally 280–2,000, preferably 350–1,500.

Specific examples of the phenols include phenol, butylphenol, octylphenol, nonylphenol, cresol, and the like. Examples of the aldehydes include formaldehyde, acetaldehyde, propionaldehyde, butyraldehyde, and the like. Examples of the ketones include acetone, methyl ethyl ketone, methyl isobutyl ketone, cyclohexanone, acetophenone, and the like. Examples of the diolefins include butadiene, isoprene, 1,3-pentadiene, dicyclopentadiene, and the like.

Examples of the alkyl group include butyl, isobutyl, t-butyl, pentyl, 2-methylbutyl, 2,2-dimethylpropyl, hexyl, cyclohexyl, benzyl, octyl, 2-ethylhexyl, nonyl, decyl, cetyl, lauryl, myristyl, palmithyl, stearyl, arachidyl, behenyl, oleyl, and the like.

Examples of the alkylene group include butylene, octylethylene, 1,4-cyclohexylene, octamethylene, decamethylene, and the like.

Examples of the aryl group include phenyl, 2-methylphenyl, 4-methylphenyl, 4-octylphenyl, 4-nonylphenyl, 4-cumylhenyl, naphthyl, 4-phenylphenyl, and the like.

Examples of the arylene group include 1,4-phenylene, 4,4'-biphenylene, 1,4-phenylene-isopropylidene-1,4-phenylene, 1,4-phenyleneoxy-1,4-phenylene, 1,4-(2'-t-butyl-5'-methyl)phenylene-butylidene-1,4-(2'-methyl-5'-t-butyl)phenylene, and the like.

As examples of the condensation products of phenols with aldehydes and/or ketones, mention may be made of the condensation product of p-nonylphenol with formaldehyde, the condensation product of p-octylphenol with formaldehyde, the condensation product of p-octylphenol with acetone, and the like. As examples of the condensation products of phenols with diolefins, mention may be made of the condensation product of p-octylphenol with dicyclopentadiene, and the like. Etherification products based on such condensation products can be obtained, besides by actual condensation, by hydrolyzing cresol-novolak type epoxy resins.

The partially etherified products of polyhydric alcohols used in the invention in which glycerol or polyglycerol is used as a polyhydric alcohol are of various kinds. Part of them can be represented by the following formula.

R[O—CH$_2$CH(OH)—CH$_2$)$_n$—OH]$_m$ wherein R denotes a C$_4$-C$_{30}$ straight or branched alkyl group, alkylene group, aryl group, arylene group, residual group of a novolak-type condensation product, or the hydrogenation product of the residual group of a novolaktype condensation product, and n and m each denote a natural number.

In the case of a partially etherified product of glycerol or polyglycerol of a single component, n in the above formula is usually 1–4, preferably 1–3, and m is usually 1–6, preferably 1–4. Usually, the partially etherified products of glycerol or polyglycerol are used as a mixture and unpurified. In such cases, n is usually 1.0–4.0, preferably 1.0–3.0 and m is usually 1.0–6.0, preferably 1.5–4.0, as the average for the partially etherified product used, as a whole. When n or m is too large, the compatibility with thermoplastic saturated norbornene group polymers are lowered.

Such partially etherified products of glycerol or polyglycerol can be synthesized, for example, by reacting from monohydric to tetrahydric alcohols or from monohydric to tetrahydric phenols with glycidol or by reacting epoxy compounds with glycerol or polyglycerol. As specific examples, mention may be made of 3-octyloxy-1,2-propanediol, 3-decyloxy-1,2-propanediol, 3-lauryloxy-1,2-propanediol, 3-myristyloxy-1,2-propanediol, 3-palmityloxy-1,2-propanediol, 3-stearyloxy-1,2-propanediol, 3-arachidyloxy-1,2-propanediol, 3-behenyloxy-1,2-propanediol, 3-oleyloxy-1,2-propanediol, 3-(2-ethyl-hexyloxy)-1,2-propanediol, 3-(2-hexyldecyloxy)-1,2propanediol, 3-phenoxy-1,2-propanediol, 3-(4-methylphenyloxy)-1,2-propanediol, 3-(4-i-propylphenyloxy)-1,2-propanediol, 3-(4-octylphenyloxy)-1,2-propanediol, 3-(4-nonylphenyloxy)-1,2-propanediol, 3-[4-[1-methyl-1-(4-hydroxyphenyl)ethyl]phenyloxy]-1,2propanediol, 1,6-di(2,3-dihydroxypropyloxy)hexane, 1,4-di(2,3-dihydroxypropyloxy)cyclohexane, 1,4-di(2,3-dihydroxypropyloxy)benzene, 2,2-bis[4-(2,3-dihydroxypropyloxy)phenyl]propane, 1-(4-nonylphenyl)-2,6,7-trihydroxy-4-oxoheptane, poly-(oxy-2-hydroxytrimethylene)phenyl ether, poly(oxy-2-hydroxytrimethylene)-octylphenyl ether, poly(oxy-2-hydroxytrimethylene)-nonylphenyl ether, poly(oxy-2-hydroxytrimethylene)lauryl ether, poly(oxy-2-hydroxytrimethylene)cetyl ether, poly(oxy-2-hydroxytrimethylene)stearyl ether, ethers obtained by the reaction of the condensation products of p-nonylphenol and formaldehyde with glycidol, ethers obtained by the reaction of the condensation products of p-octylphenol and formaldehyde with glycidol, ethers obtained by the reaction of the condensation products of p-nonylphenol and dicyclopentadiene with glycidol, ethers obtained by the reaction of the condensation products of p-nonylphenol and dicyclopentadiene with glycidol, and so forth.

As examples of partially etherified products of other polyhydric alcohols having 3 or more hydroxy groups, there may be mentioned 1,6-dihydroxy-2,2-di(hydroxymethyl)-7-(4-nonylphenyloxy)-4-oxoheptane, 1,6-dihydroxy-2-methyl-2-hydroxymethyl-7-(4-nonylphenyloxy)-4-oxoheptane, 2-hydroxymethyl-2-(4-nonylphenyloxy)methyl-1,3-propanediol, 2-methyl-2-(4-nonylphenyloxy)methyl-1,3-propanediol, 2,2,6-tri(-hydroxymethyl)-6-(4-nonylphenyloxy)methyl-1,7-dihydroxy-4-oxoheptane, and so forth.

These partially etherified products are used each alone or in a combination of two or more thereof. The amount thereof to be incorporated is generally 0.01–10 parts by weight, preferably 0.1–5 parts by weight, relative to 100 parts by weight of the thermoplastic saturated norbornene groups polymer. When the amount is too small the effect of improving the adhesion to the coating film (i.e., protective film) formed by application of an acrylic ultraviolet curing coating material is small, whereas when it is too large it results in marked lowering of heat distortion temperature and lowering of mechanical strength.

These partially etherified products may generally be incorporated into the present composition by mixing them with a thermoplastic saturated norbornene group polymer and then melt-kneading the mixture with a twin screw extruder and the like, or adding and dissolving them into a solution of thermoplastic saturated norbornene group polymer and then vaporizing off the solvent.

The resin composition of the present invention may be incorporated with antioxidants, light stabilizers, ultraviolet absorbers, dyes, flame retardants, hydrogenated petroleum resins, antistatic agents, heat stabilizers, etc. within a range not deleterious to the intended effect of improving the adhesion to protective films comprising acrylic ultraviolet curing coating materials or such.

OPTICAL DISK

Though the composition of the present invention can be worked into various formed articles by conventional methods of forming, it is particularly suitable for forming transparent substrates, such as optical disk substrates and the like, by injection molding.

The methods used for forming optical disk substrates are not particularly limited. Conventional processes for forming plastics, for example, injection molding, extrusion, compression molding, etc., can be used.

The optical disk can be prepared by laminating, on the substrate thus prepared, an information recording film and/or a light reflecting film and a protective film, etc.

As examples of recording materials used for forming the information recording film, mention may be made of rare earth-transition metal amorphous alloys such as Tb-Fe based alloys, Dy-Fe based alloys, Cd-Tb-Fe based alloys, Cd-Tb-Dy-Fe based alloys, Cd-Co based alloys, and Tb-Fe-Co based alloys; phase change type recording materials such as Ge-Te based alloys, Sb-Te based alloys, In-Sb based alloys, Ge-Sb-Te based alloys, and In-Sb-Te based alloys; organic pigment type recording materials such as those of methine-polymethine, quinone, phthalocyanine and dithiol types; and write-once type recording materials such as those based on Te-$CS_2$, Pb-Te-Se, Te-C, $TeO_2$, Sb-Se, and Bi-Te. These recording materials are formed into a film on the substrate by such means of film formation as vapor deposition, spattering, ion plating, and the like. The film thickness is usually about 500–5,000 Å.

Further, gold, platinum, aluminum, and like metals can be used as a light reflecting film for CD, CD-ROM, laser disks, etc. Also usable as a light reflecting film are films formed by vacuum deposition of metals as nickel and the like.

The optical disk may be provided between the disk and a surface protective layer or a recording layer with a protective layer, reflective layer, dielectric layer or such. Examples of layer-forming materials for these protective and other layers include inorganic substances such as CdS, ZnSe, $SiO_2$, Si, $Si_3N$, $Si_3N_4$, AlN, $TiO_2$, $TaO_2$, MgF, etc., or resins such as ultraviolet curing coating materials, etc. The substrate formed by using the present composition is, in particular, excellent in adhesion to protective resin films comprising ultraviolet curing coating materials or like materials, as compared with disks of the prior art.

Optical disks include those of single substrate and those comprising two substrates sticked together.

USES

The composition of the present invention can be worked into various formed articles by conventional forming methods. In particular, the composition is suitable for forming optical disks and other optical parts including optical lenses, optical mirrors, optical card substrates, transparent covers, window materials, substrates for liquid crystal display, transparent sheets, transparent films, etc. by injection molding, and can give molded articles which show good adhesion to coatings formed from acrylic ultraviolet curing coating materials (i.e., protective coating material), hard coating materials, or such. For optical disks, particularly among these uses, coatings formed by application of acrylic ultraviolet curing coating materials or such are indispensable as protective coating for information recording film, so that the present composition is particularly useful for said use.

The present invention will be described in more detail below with reference to Examples, Referential Examples and Comparative Examples, but the invention is not limited to the Examples. In the Examples, Referential Examples and Comparative Examples, parts and % are by weight unless specified otherwise.

REFERENTIAL EXAMPLE 1

To 1 mole of nonylphenol were added 2 moles of glycidol and $10^{-2}$ mole of triethylamine and the resulting mixture was allowed to react at 80° C. for 1 hour. To 100 parts of the reaction mixture was added 50 parts of toluene and the mixture was filtered under vacuum through a filter having a pore size of 0.5 μm. One liter of the filtrate was stirred with a stirrer at 10 Torr and 150° C. for 2 hours to remove toluene and triethylamine, whereby a reaction product was obtained.

Analysis of the reaction product by gas chromatography showed that nonyphenol and glycidol contents were respectively less than the detection limits and confirmed that the reaction product as a whole was poly(oxy-2-hydroxytrimethylene)nonylphenyl ether, $HO[CH_2CH(OH)CH_2O]_nC_6H_4C_9H_{19}$, n being a natural number and the average of n for all molecules being 2, in which nonylphenol had reacted with glycidol in a ratio of one molecule of the former to two molecules of the latter.

EXAMPLE 1

To 100 parts of a hydrogenation product (intrinsic viscosity determined in decalin at 80° C.: 0.5 dl/g, hydrogenation rate: 99.5% or more) of a ring-opening polymer of 6-ethyl-1,4:5,8-dimethano-1,4,4a,5,6,7,8,8a-octahydronaphthalene were added 0.5 part of the poly-(oxy-2-hydroxytrimethylene)nonylphenyl ether, obtained in Referential Example 1, as a partially etherified product and 0.03 part of tetrakis[methylene-3-(3,5-di-tert-butyl-4-hydroxyphenyl)propionate]methane as a heat stabilizer, and the mixture was kneaded at 230° C. by use of a twin screw extruder (TEM-35, a trade name, mfd. by TOSHIBA MACHINE CO., LTD.) to form pellets. The pellets were analyzed by using a differential scanning colorimeter (DSC) to find that the glass transition temperature (Tg) of the composition was 137° C.

The pellets were injection-molded with an injection molding machine (DISC-5-MIII, a trade name, mfd. by SUMITOMO HEAVY INDUSTRIES, LTD.) at a resin temperature of 350° C. and a mold temperature of 110° C. to form optical disk substrates 130 mm in diameter and 1.2 mm in thickness.

The appearance of the optical disk substrate formed above was inspected visually and by use of a microscope. No abnormality, including bleeding, was observed.

On the optical disk substrate was coated by means of spin coating an ultraviolet curing protective coating material comprising 75 parts of trimethylolpropane triacrylate, 20 parts of hexamethyleneglycol diacrylate, 5 parts of 6-functional urethane acrylate (U-6HA, a trade name, mfd. by SHIN-NAKAMURA CHEMICAL CO., LTD.) and 5 parts of benzyl dimethyl ketal and then irradiated with a high pressure mercury lamp of 80 W/cm from a distance of 10 cm for 5 seconds to effect curing.

A cellophane adhesive tape (cellotape CT 15M, a trade name, mfd. by NICHIBAN CO., LTD.) was sticked onto the surface of the cured protective film and then peeled off. The protective film was not peeled off, showing a good adhesion.

Separately, nickel was vacuum-deposited as a light reflecting film onto the optical disk substrate formed, and then an acrylic resin protective film was formed on the deposited nickel surface side in the same manner as mentioned above so as to cover the nickel deposition film part and undeposited part. The optical disk thus treated was kept in an atmosphere of a temperature of 70° C. and a relative humidity (RH) of 90% for 2,000 hours and thereafter examined for its appearance. No abnormality was observed both on the protective film surface and on the deposited nickel surface and thus in adhesion between the light reflecting film and the disk substrate. The optical disk was kept in an oven at 90° C. for 100 hours and then the disk surface was inspected for appearance and by finger touch. No abnormality was observed, including bleeding.

COMPARATIVE EXAMPLE 1

In the same manner as in Example 1 except that poly-(oxy-2-hydroxytrimethylene) nonylphenyl ether was not used, 0.03 part of tetrakis[methylene-3-(3,5-di-tert-butyl-4-hydroxyphenyl)propionate]methane was added as a heat stabilizer to 100 parts of the hydrogenation product of a ring-opening polymer of 6-ethyl-1,4:5,8-dimethano- 1,4,4a,5,6,7,8,8a-octahydronaphthalene, to form pellets. The glass transition temperature determined in the same manner as in Example 1 was 138° C.

The pellets were injection-molded to form optical disk substrates in the same manner as in Example 1. The appearance of the optical disk substrate thus molded was inspected visually and with a microscope. No abnormality, including bleeding, was observed. A protective coating film was formed on the optical disk substrate in the same manner as in Example 1 and the quality of adhesion was examined in the same manner as in Example 1. Resultantly, about 90% by area ratio of the coating film contacting with the adhesive tape was peeled off.

Separately, an optical disk having a protective film was prepared by using the optical disk substrate and subjected to a moisture resistance test and heat resistance test in the same manner as in Example 1. Examination of the appearance of the optical disk showed that, though bleeding was not observed, minute blisters had developed on the light reflecting film surface in the moisture resistance test.

REFERENTIAL EXAMPLE 2

A reaction product was obtained in the same manner as in Referential Example 1 except that the amount of glycidol per 1 mole of nonylphenol was changed to 1 mole. Analysis of the reaction product by gas chromatography showed that the nonylphenol and glycidol contents were respectively less than the detection limits and confirmed that the reaction product was 3-(4-nonylphenyloxy)-1,2-propanediol.

EXAMPLE 2

Pellets were prepared in the same manner as in Example 1 except for using 1 part of 3-(4-nonylphenyloxy)-1,2-propanediol, obtained in Referential Example 2, as the partially etherified product. The glass transition temperature determined in the same manner as in Example 1 was 135° C.

Then optical disk substrates were molded and a protective coating film was formed thereon in the same manner as in Example 1. The appearance of the optical disk substrate was inspected in the same manner as in Example 1 to show no abnormality, including bleeding. Further, the quality of adhesion of the protective film was examined in the same manner as in Example 1. Resultantly, the protective film was not peeled off, thus showing a good adhesion.

REFERENTIAL EXAMPLE 3

A reaction product was obtained in the same manner as in Example 1 except that 1 mole of glycidol and $10^{-2}$ mole of triethylamine were added to 1 mole of behenyl alcohol and the resulting liquid was allowed to react. Analysis of the reaction product by gas chromatography showed that the behenyl alcohol and glycidol contents were respectively below the detection limits and confirmed that the reaction product as a whole was 3-(behenyloxy)-1,2-propanediol, in which behenyl alcohol had reacted with glycidol in a ratio of one molecule of the former to one molecule of the latter.

EXAMPLE 3

Pellets were prepared in the same manner as in Example 1 except for using 1 part of 3-(behenyloxy)-1,2-propanediol, obtained in Referential Example 3, as the partially etherified product. The glass transition temperature determined in the same manner as in Example 1 was 134° C.

Then, optical disk substrates were molded and a protective coating film was formed thereon in the same manner as in Example 1. The appearance of the optical disk substrate was inspected in the same manner as in Example 1 to show no abnormality, including bleeding. Further, the quality of adhesion of the protective film was examined in the same manner as in Example 1. The protective film was not peeled off, thus showing a good adhesion.

REFERENTIAL EXAMPLE 4

A reaction product was obtained in the same manner as in Example 1 except that 2 moles of glycidol and $10^{-2}$ mole of triethylamine were added to 1 mole of bisphenol A and the resulting liquid was allowed to react. Analysis of the reaction product by gas chromatography showed that the bisphenol A and glycidol contents were respectively below the detection limits and confirmed that the reaction product as a whole was 2,2bis[4-(2,3-dihydroxypropyloxy)phenyl]propane, in which bisphenol A had reacted with glycidol in a ratio of one molecule of the former to two molecules of the latter.

EXAMPLE 4

Pellets were prepared in the same manner as in Example 1 except for using 0.5 part of 2,2-bis[4-(2,3-dihydroxypropyloxy)phenyl]propane, obtained in Referential Example 4, as the partially etherified product. The glass transition temperature determined in the same manner as in Example 1 was 138° C.

Then optical disk substrates were molded and a protective coating film was formed thereon in the same manner as in Example 1. The appearance of the optical disk substrate was inspected in the same manner as in Example 1 to show no abnormality, including bleeding.

Further, the quality of adhesion of the protective film was examined in the same manner as in Example 1. The protective film was not peeled off, showing a good adhesion.

REFERENTIAL EXAMPLE 5

A reaction product was obtained in the same manner as in Referential Example 1 except that 2 moles of glycidol and $10^{-2}$ mole of triethylamine were added to 1 mole of stearyl alcohol and the resulting liquid was allowed to react. Analysis of the reaction product by gas chromatography showed that the stearyl alcohol and glycidol contents were respectively below the detection limits and confirmed that the reaction product as a whole was poly(oxy-2-hydroxytrimethylene)stearyl ether, $HO[CH_2CH(OH)CH_2O]_nOC_{19}H_{27}$, n being a natural number and the average of n for all molecules being 2, in which stearyl alcohol had reacted with glycidol in a ratio of one molecule of the former to two molecules of the latter.

EXAMPLE 5

Pellets were prepared in the same manner as in Example 1 except for using 0.5 part of poly(oxy-2-hydroxytrimethylene)stearyl ether, obtained in Referential Example 5, as the partially etherified product. The glass transition temperature determined in the same manner as in Example 1 was 137° C.

Then, optical disk substrates were molded and a protective coating film was formed thereon in the same manner as in Example 1. The optical disk substrate was inspected for its appearance in the same manner as in Example 1 to show no abnormality, including bleeding. Further, the quality of adhesion of the protective film was examined in the same manner as in Example 1. The protective film was not peeled off, showing a good adhesion.

COMPARATIVE EXAMPLE 2

Pellets were prepared in the same manner as in Example 1 except for using 1 part of 2,3-dihydroxypropyl stearate in place of poly(oxy-2-hydroxytrimethylene) nonylphenyl ether. Determination made in the same manner as in Example 1 gave a markedly low glass transition temperature of 127° C. Optical disk substrates were molded and the substrate was inspected for its appearance in the same manner as in Example 1 to show the development of bleeding. Further, a protective coating film was formed and the quality of adhesion of the protective film was examined in the same manner as in Example 1. Resultantly, about 50% by area ratio of the protective film contacting the adhesive tape was peeled off.

Separately, an optical disk having a protective coating film was prepared by using the optical disk substrate and subjected to a moisture resistance test in the same manner as in Example 1. Examination of the appearance of the optical disk showed minute blisters developing on the light reflecting film surface.

REFERENTIAL EXAMPLE 6

A mixture of 1,540 parts of nonylphenol and 105 parts of paraformaldehyde in 1,600 parts of toluene was subjected to a condensation reaction in the presence of 10 parts of p-toluenesulfonic acid at 100° C. for 2 hours. After the reaction, 200 parts of water was added to the reaction mixture, then stirred thoroughly, the mixture was allowed to stand to separate into two layers, and the aqueous layer was discarded. The washing operation was repeated 4 times until the separated water layer became neutral. The toluene solution of the condensation product of nonylphenol with formaldehyde obtained was analyzed by liquid chromatography. The average number of condensation of the nonylphenol component was found to be 2.0.

To 3,100 parts of the toluene solution of the condensation product of nonylphenol with formaldehyde was added 50 parts of calcium sulfate to effect dehydration, and then the calcium sulfate was removed by filtration. Then 610 parts of glycidol and 12 parts of triethylamine were added to the filtrate and heated at 90° C. for 2 hours to effect etherification. The reaction liquid was filtered under reduced pressure through a filter with a pore size of 0.5 μm, and the filtrate was gradually heated up to 190° C. while nitrogen was being blown through the liquid, to remove toluene, triethylamine and unreacted glycidol, whereby 1,510 parts of a reaction product was obtained. Analysis of the reaction product by $^1$H-NMR spectrometry confirmed that the product was a compound in which a part of glycidol had changed into polyglycidol and glycidol had reacted in a ratio of average 1.2 molecules of glycidol per one repeating unit originating from nonylphenol.

EXAMPLE 6

Pellets were prepared in the same manner as in Example 1 except for using 0.5 part of the reaction product of glycidol with the condensation product of p-nonylphenol with formaldehyde, obtained in Referential Example 6, as the partially etherified product. The glass transition temperature determined in the same manner as in Example 1 was 138° C.

Then optical disk substrates were molded and a protective coating film was formed thereon in the same manner as in Example 1. The optical disk substrate was inspected for its appearance in the same manner as in Example 1 to show no abnormality, including bleeding. Further, the quality of adhesion of the protective film was examined in the same manner as in Example 1. The protective film was not peeled off, showing a good adhesion.

REFERENTIAL EXAMPLE 7

A toluene solution of a condensation product of nonylphenol with formaldehyde was obtained in the same manner as in Referential Example 6 except for altering the amount of paraformaldehyde to 140 parts. The condensation product of nonylphenol with formaldehyde obtained was analyzed by liquid chromatography to find that the average number of condensation of the nonylphenol component was 2.9.

The toluene solution, 3100 parts, of the condensation product of nonylphenol with formaldehyde was reacted with 610 parts of glycidol in the same manner as in Referential Example 6 to obtain 1,490 parts of a reaction product. Analysis of the reaction product by $^1$H-NMR spectrometry confirmed that the product was a compound in which a part of glycidol had changed into polyglycidol and glycidol had reacted in a ratio of average 1.2 molecules of glycidol per one repeating unit originating from nonylphenol.

EXAMPLE 7

Pellets were prepared in the same manner as in Example 1 except for using 0.4 part of the reaction product of glycidol with the condensation product of p-nonylphenol with formaldehyde, obtained in Referential Example 7, as the partially etherified product. The glass transition temperature determined in the same manner as in Example 1 was 138° C.

Then, optical disk substrates were molded and a protective coating film was formed thereon in the same manner as in Example 1. The optical disk substrate was inspected for its appearance in the same manner as in Example 1 to show no abnormality, including bleeding. Further, the quality of adhesion of the protective film was examined in the same manner as in Example 1. The protective film was not peeled off, showing a good adhesion.

REFERENTIAL EXAMPLE 8

A mixture of 1,440 parts of octylphenol and 105 parts of paraformaldehyde in 1,600 parts of toluene was subjected to a condensation reaction in the presence of 10 parts of p-toluenesulfonic acid at 100° C. for 2 hours. After the reaction, 200 parts of water was added to the reaction mixture, then stirred thoroughly, the mixture was allowed to stand to separate into two layers, and the aqueous layer was discarded. The washing operation was repeated 4 times until the separated water layer became neutral. The toluene solution of the condensation product of octylphenol with formaldehyde obtained was analyzed by liquid chromatography. The average number of condensation of the nonylphenol component was found to be 2.0.

To 3,100 parts of the toluene solution of the condensation product of nonylphenol with formaldehyde was added 50 parts of calcium sulfate to effect dehydration, and then the calcium sulfate was removed by filtration. Then 610 parts of glycidol and 12 parts of triethylamine were added to the filtrate and heated at 90° C. for 2 hours to effect etherification. The reaction liquid was filtered under reduced pressure through a filter with a pore size of 0.5 μm, and the filtrate was gradually heated up to 190° C. while nitrogen was being blown through the liquid, to remove toluene, triethylamine and unreacted glycidol, whereby 1,480 parts of a reaction product was obtained. Analysis of the reaction product by $^1$H-NMR spectrometry confirmed that the product was a compound in which a part of glycidol had changed into polyglycidol and glycidol had reacted in a ratio of average 1.2 molecules per one repeating unit originating from octylphenol.

EXAMPLE 8

Pellets were prepared in the same manner as in Example 1 except for using 0.5 part of the reaction product of glycidol with the condensation product of octylphenol with formaldehyde, obtained in Referential Example 8, as the partially etherified product. The glass transition temperature determined in the same manner as in Example 1 was 137° C.

Then optical disk substrates were molded in the same manner as in Example 1 and a protective film was formed thereon in the same manner as in Example 1. The optical disk substrate was ispected for its appearance in the same manner as in Example 1 to show no abnormality, including bleeding. Further, the quality of adhesion of the protective film was examined in the same manner as in Example 1. The protective film was not peeled off, showing a good adhesion.

Thus, according to the present invention, there is provided a resin composition based on a thermoplastic saturated norbornene group polymer which is excellent in adhesion to the information recording film of optical disks and adhesion to a hard coating film or a protective film formed by coating an acrylic ultraviolet curing coating material, without deterioration of excellent heat resistance and transparency inherent to thermoplastic saturated norbornene group polymers. Further, according to the present invention, there are provided optical disk substrates using said composition and optical disks using said optical disk substrates.

What is claimed is:

1. A thermoplastic polymer composition comprising (i) a substantially saturated thermoplastic polymer of a norbornene group monomer or monomer containing a norbornene group and (ii) a partially etherified product of a polyhydric alcohol having 3 or more hydroxyl groups incorporated thereinto.

2. A composition according to claim 1 wherein the polyhydric alcohol having 3 or more hydroxyl groups is one which has 3-8 hydroxyl groups.

3. A composition according to claim 1 wherein the partially etherified product of a polyhydric alcohol having 3 or more hydroxyl group is one in which a substituent used for etherification has 4-100 carbon atoms.

4. A composition according to claims 1 to wherein the partially etherified product of a polyhydric alcohol having 3 or more hydroxyl groups is one in which a substituent used for etherification has 4-30 carbon atoms.

5. A composition according to claim 1 wherein the partially etherified product of a polyhydric alcohol having 3 or more hydroxyl groups is one which has 2 to 16 free alcoholic hydroxyl groups in one molecule.

6. A composition according to claim 1 wherein the partially etherified product of a polyhydric alcohol having 3 or more hydroxyl groups is a product of partial etherification of a polyhydric alcohol having 3 or more hydroxyl groups with at least one compound selected from the group consisting of (a) condensation products of phenols with aldehydes and/or ketones, (b) condensation products of phenols with diolefins and (c) hydrogenation products of these condensation products.

7. A thermoplastic polymer according to claim 1, wherein said substantially saturated thermoplastic polymer is (a) a hydrogenation product of ring-opening polymer or copolymer of norbornene group monomers or (b) a copolymer of norbornene group monomers with olefinic monomers.

8. A thermoplastic polymer according to claim 1, wherein said substantially saturated thermoplastic polymer is a hydrogenation product of ring-opening polymer or copolymer of norbornene group monomers.

9. A thermoplastic polymer according to claim 1, wherein said substantially saturated thermoplastic polymer is a copolymer of norbornene group monomers with olefinic monomers.

* * * * *